(12) United States Patent
Ostfeld

(10) Patent No.: US 9,578,863 B2
(45) Date of Patent: Feb. 28, 2017

(54) FISH MEASURING TAPE

(71) Applicant: Keith Ostfeld, Santa Rosa Beach, FL (US)

(72) Inventor: Keith Ostfeld, Santa Rosa Beach, FL (US)

(*) Notice: Subject to any disclaimer, the term of this patent is extended or adjusted under 35 U.S.C. 154(b) by 164 days.

(21) Appl. No.: 14/672,000

(22) Filed: Mar. 27, 2015

(65) Prior Publication Data

US 2016/0278357 A1 Sep. 29, 2016

Related U.S. Application Data

(60) Provisional application No. 61/969,873, filed on Mar. 25, 2014.

(51) Int. Cl.
  *G01B 3/10* (2006.01)
  *A01K 97/00* (2006.01)

(52) U.S. Cl.
  CPC ............ *A01K 97/00* (2013.01); *G01B 3/1082* (2013.01); *G01B 3/1084* (2013.01)

(58) Field of Classification Search
  CPC .................................................. G01B 3/1082
  USPC ........................................ 33/494, 759, 679.1
  See application file for complete search history.

(56) References Cited

U.S. PATENT DOCUMENTS

| | | | |
|---|---|---|---|
| 461,106 A * | 10/1891 | Oberly | A01K 87/00 33/494 |
| 4,969,286 A | 11/1990 | Belanger | |
| 4,995,188 A | 2/1991 | Ewing | |
| 5,588,215 A * | 12/1996 | Hart | G01B 3/02 33/2 R |
| 5,637,838 A * | 6/1997 | Arey | A01K 61/001 177/148 |
| 6,115,932 A * | 9/2000 | Fedora | A01K 97/00 33/494 |
| 7,412,794 B2 | 8/2008 | Smith | |
| 7,472,488 B2 * | 1/2009 | Besch | A01K 29/00 33/511 |
| 7,665,220 B1 * | 2/2010 | Gee | A01K 97/00 33/485 |
| 8,141,262 B1 * | 3/2012 | Lee | A01K 97/00 33/511 |
| 9,020,416 B2 * | 4/2015 | Wills | H04M 1/0264 43/4 |
| 9,046,341 B2 * | 6/2015 | Orman | G01B 3/1084 |
| 2004/0163267 A1 * | 8/2004 | Bini | A01K 97/00 33/511 |

(Continued)

*Primary Examiner* — G. Bradley Bennett
(74) *Attorney, Agent, or Firm* — Global Intellectual Property Agency, LLC; Daniel Boudwin

(57) ABSTRACT

A fish measuring tape and a method for using the same is provided. The fish measuring tape comprises an elongated body portion having a first end and a second end. The body portion includes a plurality of markings designating increasing length from the first end towards the second end. The body portion further includes a plurality of graphic representations that allow a user to identify different fish species. The plurality of graphic representations is aligned with a specific marking of said plurality of markings to indicate the regulated length and size of a specific fish species that can be retained for personal use. The body portion further comprises a plurality of bag limits configured to identify a quantity for each said specific fish species that can be kept.

6 Claims, 3 Drawing Sheets

(56) References Cited

U.S. PATENT DOCUMENTS

| | | | |
|---|---|---|---|
| 2007/0209219 A1* | 9/2007 | Ertmer | G01B 3/04 33/511 |
| 2008/0083152 A1 | 4/2008 | Wang | |
| 2009/0084020 A1 | 4/2009 | Sorey | |
| 2010/0088915 A1* | 4/2010 | Neff | A61B 5/107 33/759 |
| 2014/0007443 A1* | 1/2014 | Orman | G01B 3/1084 33/701 |

* cited by examiner

FISH MEASURING TAPE

CROSS REFERENCE TO RELATED APPLICATION

This application claims the benefit of U.S. Provisional Application No. 61/969,873 filed on Mar. 25, 2014. The above identified patent application is herein incorporated by reference in its entirety to provide continuity of disclosure.

FIELD OF THE INVENTION

The present invention relates to fishing accessories. Specifically, the present invention describes a fish measuring tape configured to allow a user to determining if a caught fish complies with regulated length and size of specific fish species that can be retained for personal use.

BACKGROUND OF THE INVENTION

Fisheries management is the science of balancing the impacts of habitat changes, fishing pressure for different kinds of fish, the desires of different anglers for the kind, numbers, and size of fish they would like to catch, and the biological potential of the waters to grow and support the kinds, size, and numbers of fish that anglers want to catch. Fisheries management, in this way, finds ways to protect fishery resources so sustainable exploitation is possible. Modern fisheries management is often referring to certain rules and regulations, and the implementation of these rules and regulations. One of the most effective techniques for protecting fisheries is by stocking or improving habitat. However, another one of the most important tools used for fisheries conservation is through controlling angler impacts on fish populations. These regulations are designed to conserve fish populations and help provide the kind of fishing experience that anglers want. For example, length limits are one of the most effective ways of reducing the overall take of a species, while still allowing anglers to take some fish home. This regulation is also be used to protect a certain portion of the fish population that may be more vulnerable or could affect the future of the population.

Generally, these regulations require anglers to release captured fish if they fall within a given size range, allowing anglers to keep only smaller or larger fish. These regulations can change from lake to lake, state to state, or region to region. If an angler catches a fish of legal species and legal size, he must immediately decide to release or keep it as part of his day's limit. An angler may not have in his possession more fish than the day's limit, or fish other than those of legal size. Therefore, it is imperative for an angler to determine whether he has caught a fish of legal species and legal size immediately or else possible fines for failing to follow regulations.

Devices have been disclosed in the prior art that relate to fish measuring devices. These include devices that have been patented and published in patent application publications. Some of these devices provide a measuring tape that is attached to the end of a fishing pole and can be pulled out therefrom. Other devices provide a fishing pole with length markings along the length of the pole. These devices, however, fail to provide a measuring tape that is attached onto the distal end of the pole and further fail to provide markings that designate the required lengths of different fish species that may be caught.

The present invention overcomes these limitations by providing a fish measuring tape and a method of using the same. The fish measuring tape comprises an elongated body portion having a first end and a second end. The body portion includes a plurality of markings designating increasing length from the first end towards the second end. The body portion further includes a plurality of graphic representations that allow a user to identify different fish species. The plurality of graphic representations is aligned with a specific marking of said plurality of markings to indicate the regulated length and size of a specific fish species that can be retained for personal use. The body portion further comprises a plurality of bag limits configured to identify a quantity for each said specific fish species that can be kept.

It is therefore submitted that the present invention is substantially divergent in design elements from the prior art, and consequently it is clear that there is a need in the art for an improvement to heating mats. In this regard, the instant invention substantially fulfills these needs.

SUMMARY OF THE INVENTION

In view of the foregoing disadvantages inherent in the known types of fish measuring tape now present in the prior art, the present invention provides a fish measuring tape wherein the same can be utilized for determining whether a caught fish can be kept for personal use.

It is therefore an object of the invention to provide a new and improved fish measuring tape that has all of the advantages of the prior art and none of the disadvantages.

Another object of the present invention is to provide a new and improved fish measuring tape comprising an elongated body portion having a first end and a second end configured to determine whether a caught fish can be kept for personal use.

Yet another object of the present invention is to provide a new and improved fish measuring tape comprising a plurality of markings that designate increasing length extending from said first end towards said second end.

Still yet another object of the present invention is to provide a new and improved fish measuring tape further comprising a plurality of graphic representations, wherein each graphic representation is aligned with a specific marking 22 to indicate the regulated length and size of the specific fish species that can be retained for personal use.

A further object of the present invention is to provide a new and improved fish measuring tape further comprising a plurality of bag limits configured to identify a maximum quantity or maximum weight that can be kept of a specific fish species.

Still yet another object of the present invention is to provide a new and improved fish measuring tape wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
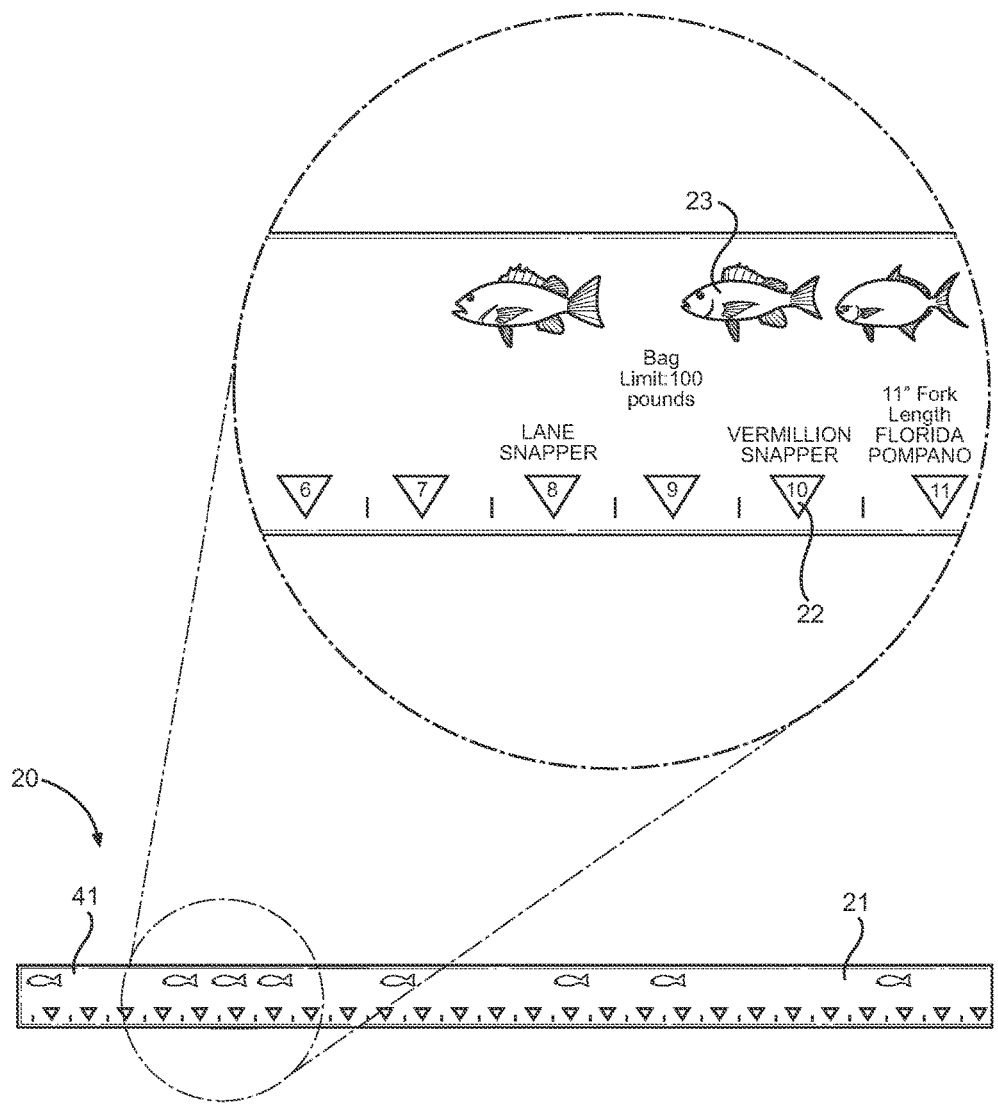
FIG. 1 shows an overhead perspective of the present invention.

Reference is made herein to the attached drawings. Like reference numerals are used throughout the drawings to depict like or similar elements of the measuring tape. For the purposes of presenting a brief and clear description of the present invention, the preferred embodiment will be discussed as used for determining if a caught fish can be kept for personal use. The figures are intended for representative purposes only and should not be considered to be limiting in any respect.

Figure 2:
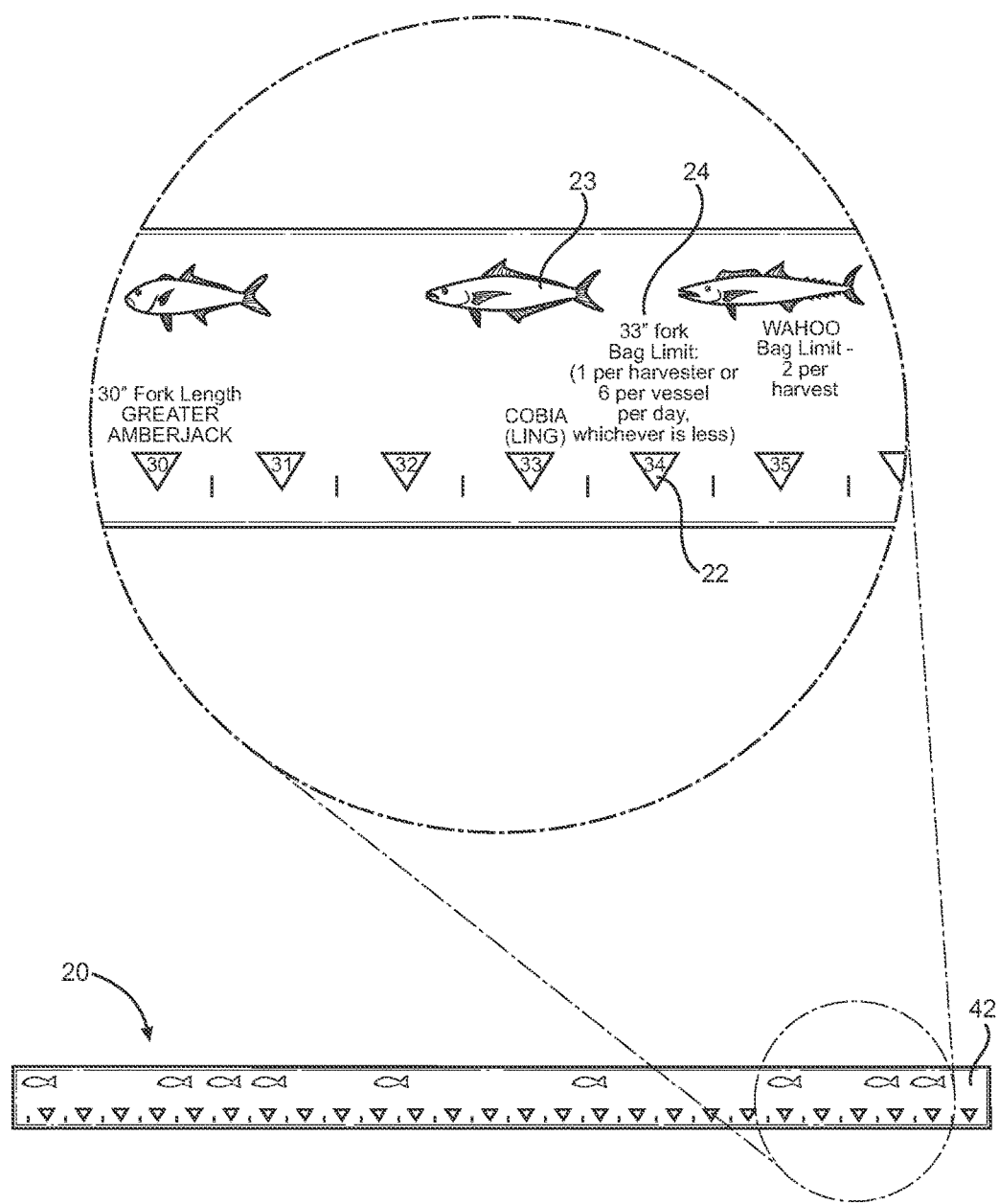
FIG. 2 shows an overhead perspective of the present invention.

Referring now to FIGS. 1 and 2, there are shown a pair of overhead perspectives of the measuring tape 20. The measuring tape 20 includes an elongated body portion 21 having a first end 41 and a second end 42. Preferably, the body portion 21 is rectangular in shape, however, it is contemplated that other sizes and shapes are suitable. The elongated body portion 21 comprise a plurality of markings 22 that designate increasing length from the first end 41 towards the second end 42. Preferably, the markings 22 are evenly spaced apart and designate length in inches. However, alternative measuring units are likewise contemplated.

The body portion 21 also includes a plurality of graphic representations 23 of different fish species aligned with the plurality of markings 22 These plurality of graphic representations 23 allow a user to quickly identify the fish species that he has caught. Furthermore, the plurality of graphic representations 23 is aligned with a specific marking 22 to indicate a regulated length and size of each specific fish species that can be retained for personal use. In this way, the user can measure his caught fish against the body portion 21 to determine whether his caught fish satisfies the regulated length and size of the specific fish species, which would allow him to retain the caught fish.

It is contemplated that the plurality of graphic representations 23 will comply with different regulations, whether these regulations differ by state, region, lake, or other areas. As previously mentioned, the body portion 21 having the plurality of markings 22 and the plurality of graphic representations 23 allow for a user to have a constant, convenient, and immediate reminder of the proper size specifications for retaining each fish species. Thereby, the measuring tape 20 greatly reduces the likelihood that a user may violate fishing regulations.

Furthermore, the body portion 21 also includes a plurality of bag limits 24. The plurality of bag limits 24 are configured to indicate to users the limit of fish within for each specific species that may be kept. Each bag limit 24 is correlated with a specific graphic representation 23 to align with a specific fish species. The bag limits 24 can be delineated by maximum quantity or maximum weight.

Figure 3:
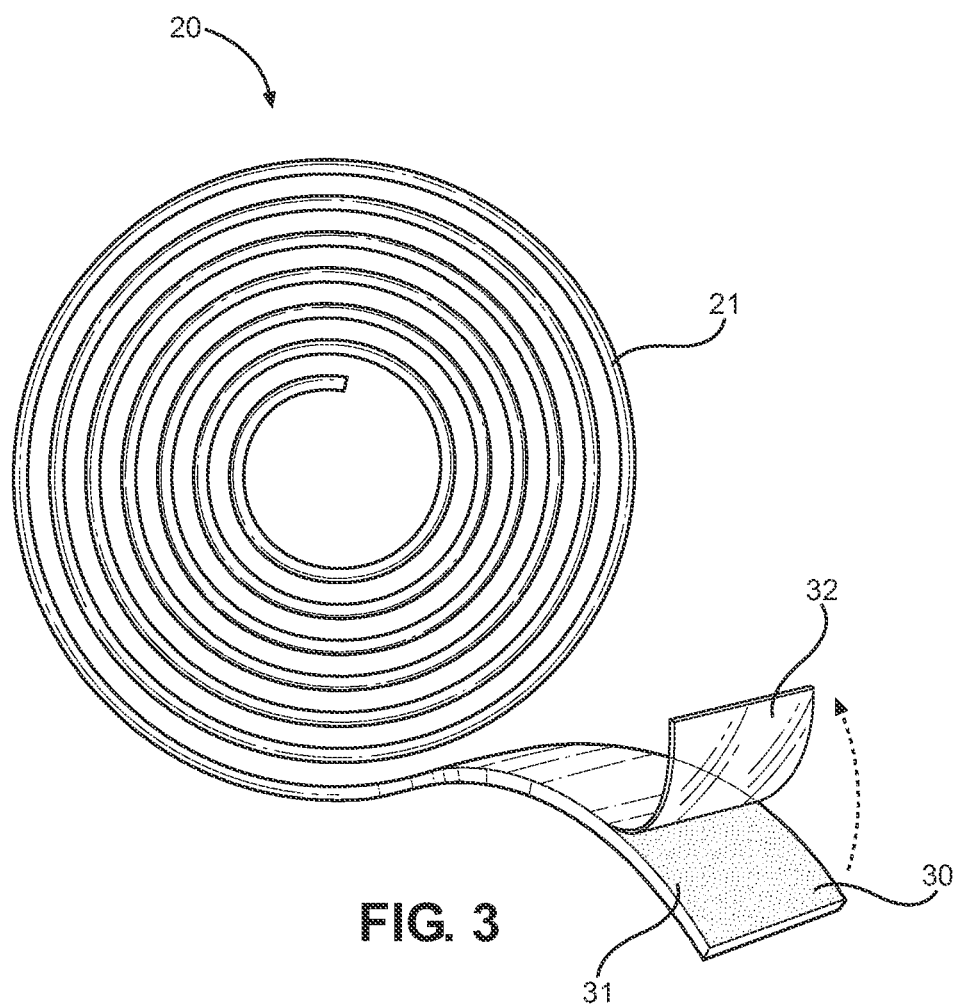
FIG. 3 shows a side perspective of the present invention.

Referring now to FIG. 3, there is shown a side perspective of the fish measuring tape 20. Preferably, the measuring tape 20 is configured to be coiled on itself like a conventional tape measure. The measuring tape 20 is preferably composed of fiberglass, however, it is contemplated that other durable, tear resistant, waterproof material. In some embodiments, like the illustrated embodiment, the tape measure 20 can be removably attached to a fishing rod. The tape measure 20 can include an adhesive 30 on an interior side 31 of the body portion 21. Furthermore, the adhesive 30 can be covered by a pull tab 32 that can be peeled away from the adhesive 30. In this way, the tape measure 20 can be attached to the fishing rod to allow for easy measuring.

According to the preferred embodiment of the fish measuring tape 20, the fish measuring tape 20 further provides a method for determining whether a caught fish can be kept for personal use, comprising the steps of:

identifying a fish species of a caught fish using a plurality of graphic representations on an elongated body portion having a first end and a second end;

placing the caught fish along said body portion extending from said first end towards said second end;

measuring length of said caught fish using a plurality of markings on said body portion configured to designate increasing length from said first end to said second end;

wherein said plurality of graphic representations is aligned with a specific marking of said plurality of markings to indicate a regulated length and size for each said fish species that can be retained for personal use;

determining if said caught fish complies with said regulated length and size for said fish species that can be retained for personal use.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish measuring tape, comprising:
   an elongated body portion configured to allow a user to follow fishing regulations regarding specific fish species when catching fish having a first end and a second end;
   said body portion further comprising a plurality of markings, a plurality of graphic representations, and a plurality of bag limits;
   wherein said plurality of markings is configured to designate increasing length from said said first end extending towards said second end;
   wherein said plurality of graphic representations is configured to allow a user to identify each said fish species;
   said plurality of graphic representations is aligned with a specific marking of said plurality of markings to indicate a regulated length and size of each said fish species that can be retained for personal use.

2. The fish measuring tape of claim 1, wherein said body portion further includes a plurality of bag limits configured to identify a maximum quantity for each said fish species that can be kept.

3. The fish measuring tape of claim 1, wherein said plurality of markings are evenly spaced apart from said first end towards said second end.

4. The fish measuring tape of claim 1, wherein said elongated body portion is rectangular in shape.

5. The fish measuring tape of claim 1, wherein said elongated body portion is configured to be attached to a fishing rod by an adhesive on an interior side of said body portion;
   wherein said adhesive is covered by a pull tab that is configured to be peeled away from said adhesive.

6. A method for determining whether a caught fish can be kept for personal use, comprising the steps of:
   identifying a fish species of a caught fish using a plurality of graphic representations on an elongated body portion having a first end and a second end;
   placing the caught fish along said body portion extending from said first end towards said second end;
   measuring length of said caught fish using a plurality of markings on said body portion configured to designate increasing length from said first end to said second end;
   wherein said plurality of graphic representations is aligned with a specific marking of said plurality of markings to indicate a regulated length and size for each said fish species that can be retained for personal use;
   determining if said caught fish complies with said regulated length and size for said fish species that can be retained for personal use.

* * * * *